Patented Apr. 3, 1923.

1,450,856

UNITED STATES PATENT OFFICE.

ROBERT ILLEMANN, OF GLASGOW, SCOTLAND.

NONCONDUCTING MATERIAL.

No Drawing.  Application filed June 3, 1920. Serial No. 386,353.

(GRANTED UNDER THE PROVISIONS OF THE ACT OF MARCH 3, 1921, 41 STAT. L., 1313.)

*To all whom it may concern:*

Be it known that I, ROBERT ILLEMANN, a citizen of the United States of America, and residing at Port Dundas, Glasgow, Scotland, have invented a certain new and useful Improved Nonconducting Material (for which I have filed application in England March 6, 1918, Patent No. 120,691), of which the following is a specification.

This invention relates to an improved non-conducting material for covering boilers, steam pipes, etc., or for other non-conducting purposes.

It is well known that still or imprisoned air is a good insulator and the object of my invention is to take a mass of a simple substance, calcined gypsum, and treat it in such manner that it will expand in bulk very considerably and, in such expansion, become so extremely porous as to form in its substance an infinity of microscopic cells or pores these microscopic cells or pores being filled with still air so that the mass serves as a highly efficient insulator and is very suitable for covering boilers, steam pipes, or for deafening or like purposes, etc.

This has, heretofore, been proposed to be done by chemical action, the chemicals being added to the gypsum along with a quantity of boiling water in excess of the gypsum.

Under my invention I avoid the use of chemicals by adopting the following procedure, I take a quantity of calcined gypsum and mix it with an excess of water, in or about the proportion of 6 parts, by measure, of water, to one part, by measure, of gypsum. The gypsum is gradually introduced and then the mixture is intermittently agitated until a plastic spongy mass of gypsum is produced by the absorption of the excess of water whereafter the water, in the gypsum mass is evaporated by heat, or allowed to evaporate gradually under atmospheric conditions. As the water evaporates its place is taken by air which enters the microscopic cells or spaces formerly occupied by the excess water, so that a mass of gypsum is produced which is highly porous, the pores being filled with still air—the product I may tern "air-cell" gypsum.

The plastic mass, before it sets, can be formed or moulded into blocks, sheets, or pieces suitable for application to a boiler or other surface as a non-conductor. If desired, before the contained water is evaporated or allowed to evaporate the plastic mass of gypsum can be applied to the boiler or other surface and be allowed to set or dry in situ.

If desired, in order to neutralize the acidity of the gypsum, a small proportion of slaked lime (say, $\frac{1}{2}$ part by measure) or (and) a small proportion of silicate of soda (say, $\frac{1}{10}$th part, by measure) may be added for the purpose of increasing the setting properties of the material and to prevent it attacking iron if the mass is applied thereto.

The air-cell gypsum is suitable not only for non-conducting purposes, so far as heat and cold is concerned, but also for sound deadening and like purposes.

For boiler covering and like purposes I preferably introduce a proportion of mineral or vegetable fibre to toughen and strengthen the material.

Having now fully described my invention what I claim and desire to secure by Letters Patent is:—

1. The method of making porous, non-conducting material suitable for covering steam boilers and for like purposes, which comprises mixing together calcined gypsum and an excess of water, then intermittently agitating the mixture until a plastic spongy mass is produced by the absorption of the excess of water, and finally evaporating the water so as to leave an air filled mass.

2. The method of making porous, non-conducting material suitable for covering steam boilers and for like purposes, which comprises mixing calcined gypsum and an excess of water having an alkaline material added thereto to neutralize the acidity of the gypsum, then intermittently agitating the mixture until a plastic spongy mass is produced by the absorption of the excess of water, and finally evaporating the water so as to leave the pores in the mass filled with air.

3. The method of making porous, non-conducting material suitable for covering steam boilers and for like purposes, which comprises mixing calcined gypsum and an excess of water having small proportions of slaked lime and sodium silicate added thereto, then intermittently agitating the mixture until a plastic spongy mass is produced by the absorption of the excess of water, and finally evaporating the water so as to leave the pores in the mass filled with air.

4. A non-conducting material comprising a porous air filled mass formed by mixing calcined gypsum with an excess of water and intermittently agitating the mixture until a plastic mass is produced, and then evaporating the water therefrom.

5. A non-conducting material comprising a porous air filled mass formed by mixing calcined gypsum with an excess of water to which an alkaline material has been added to neutralize its acidity and intermittently agitating the mixture until a plastic mass is produced, and then evaporating the water therefrom.

6. A non-conducting material comprising a porous air filled mass formed by mixing calcined gypsum with an excess of water to which small proportions of slaked lime and sodium silicate have been added to neutralize the acidity of the gypsum and intermittently agitating the mixture until a plastic mass is produced, and then evaporating the water therefrom.

In testimony whereof I affix my signature in presence of two witnesses.

ROBERT ILLEMANN.

Witnesses:
   STANLEY DUNLOP,
   WILLIAM GALL.